(12) United States Patent
Shyu

(10) Patent No.: US 6,211,917 B1
(45) Date of Patent: *Apr. 3, 2001

(54) METHOD FOR PERFORMING PLURAL MATRIX MULTIPLICATION OPERATIONS USING A SHARED LOOK-UP TABLE

(76) Inventor: Rong-Fuh Shyu, No. 4, R & D 3rd Rd., Hsin-Chu City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/383,152

(22) Filed: Aug. 25, 1999

Related U.S. Application Data

(63) Continuation of application No. 08/872,360, filed on Jun. 10, 1997, now Pat. No. 5,963,263.

(51) Int. Cl.[7] .................................................. H04N 7/01
(52) U.S. Cl. ......................... 348/453; 348/659; 345/154
(58) Field of Search ..................................... 348/453, 660, 348/661, 659, 713, 443, 444, 451; 345/150, 199, 154; 358/518, 519, 520, 521, 522, 523; 382/167

(56) References Cited

U.S. PATENT DOCUMENTS

| | | | |
|---|---|---|---|
| 4,507,676 | * 3/1985 | Dischert et al. | 348/660 |
| 4,742,386 | 5/1988 | Wilkinson | 358/13 |
| 4,829,455 | 5/1989 | Long et al. | 364/521 |
| 4,835,599 | 5/1989 | Sigel | 358/30 |
| 5,124,688 | * 6/1992 | Rumball | 348/660 |
| 5,262,847 | 11/1993 | Rodriguez et al. | 358/21 R |
| 5,504,821 | 4/1996 | Kanamori et al. | 382/167 |
| 5,510,852 | * 4/1996 | Shyu | 348/660 |
| 5,541,658 | 7/1996 | Ishiwata | 348/394 |
| 5,787,193 | * 7/1998 | Balasubramanian | 382/167 |
| 5,798,753 | 8/1998 | Zhou et al. | 345/154 |
| 5,812,204 | * 9/1998 | Baker | 348/453 |
| 5,818,613 | * 10/1998 | Masterson | 358/520 |
| 5,821,919 | * 10/1998 | Coelho | 345/154 |
| 5,841,422 | * 11/1998 | Shyu | 345/150 |
| 5,963,263 | * 10/1999 | Shyu | 348/453 |
| 5,990,876 | * 11/1999 | Shyu | 345/199 |

* cited by examiner

Primary Examiner—Michael Lee
Assistant Examiner—Trang U. Tran
(74) Attorney, Agent, or Firm—Christie, Parker & Hale, LLP

(57) ABSTRACT

In a method and apparatus for converting digitized luminance-chrominance color space signals to digitized RGB color space signals, a first combining unit generates a plurality of predetermined linear combinations of the chrominance color space signals received by a multiplexed multiplication unit which includes no more than two look-up tables that contain digitized transformation values for performing matrix multiplications of the linear combinations of the chrominance color space signals. A second combining unit linearly combines the digitized transformation values outputted by the multiplexed multiplication unit and a predetermined binary combination of the luminance color space signal in a first predetermined manner to generate three RGB color combination signals. A third combining unit linearly combines the RGB color combination signals in a second predetermined manner to obtain the RGB color space signals.

3 Claims, 10 Drawing Sheets

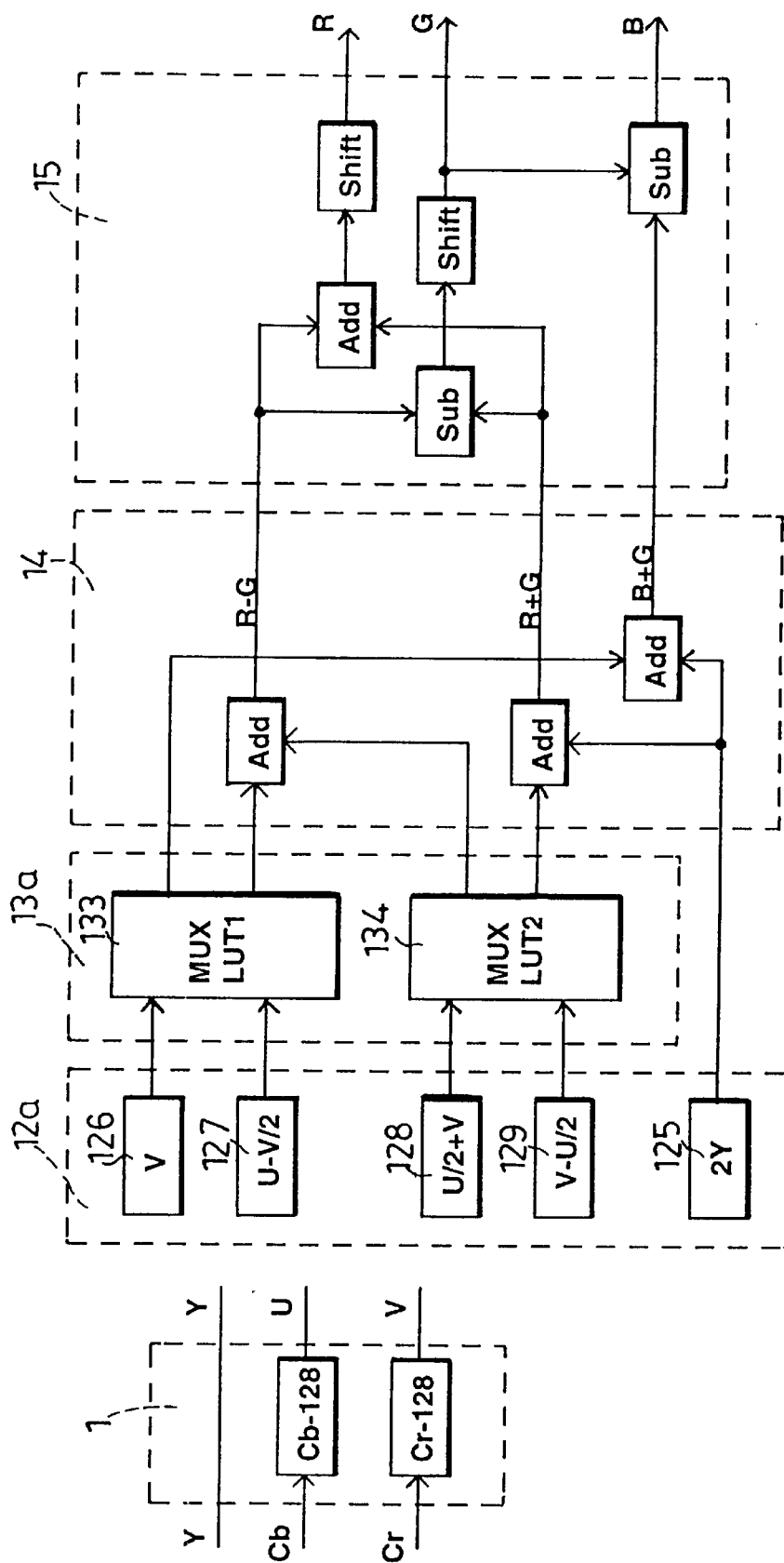
F I G. 5

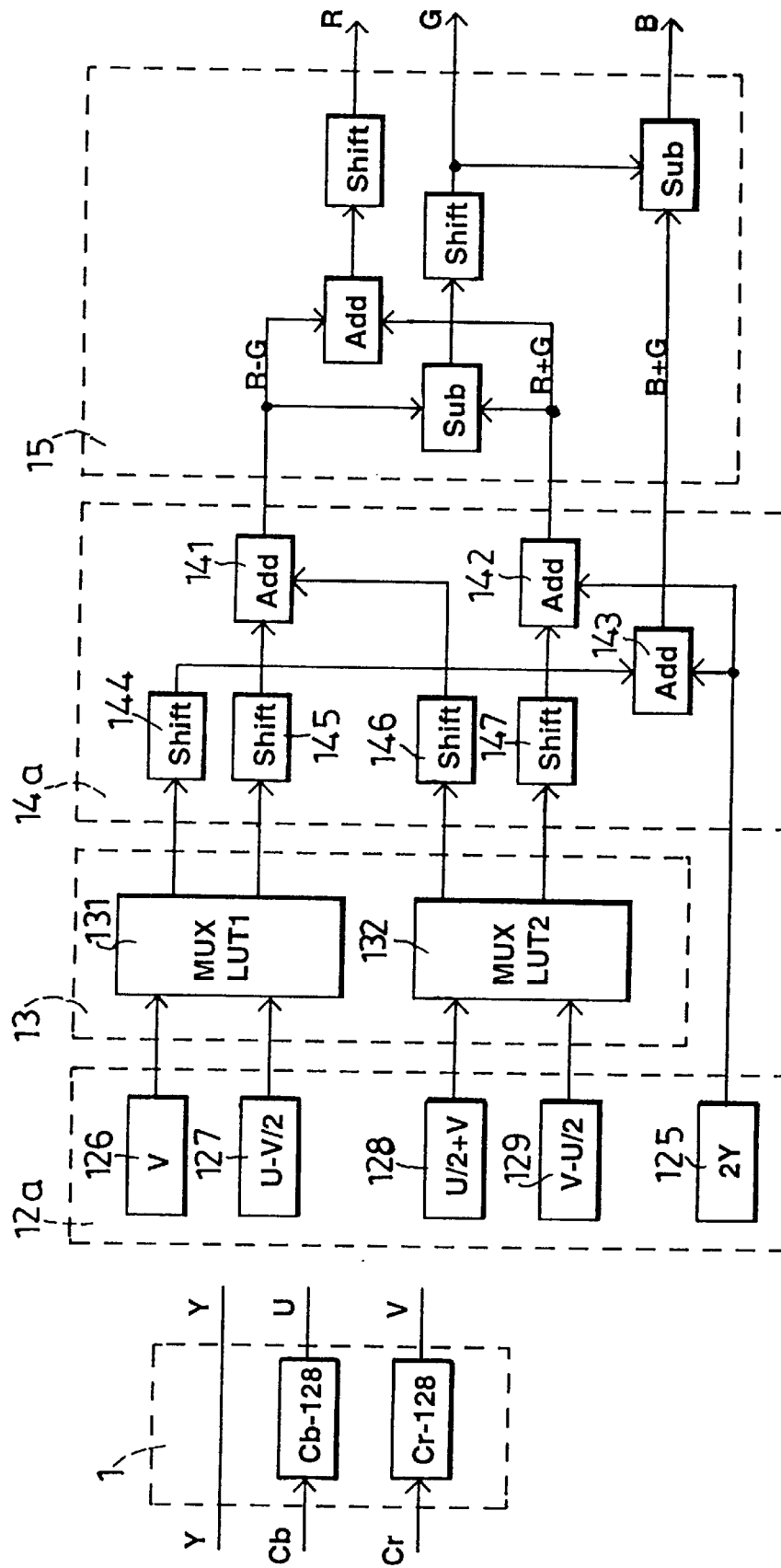
F I G. 6

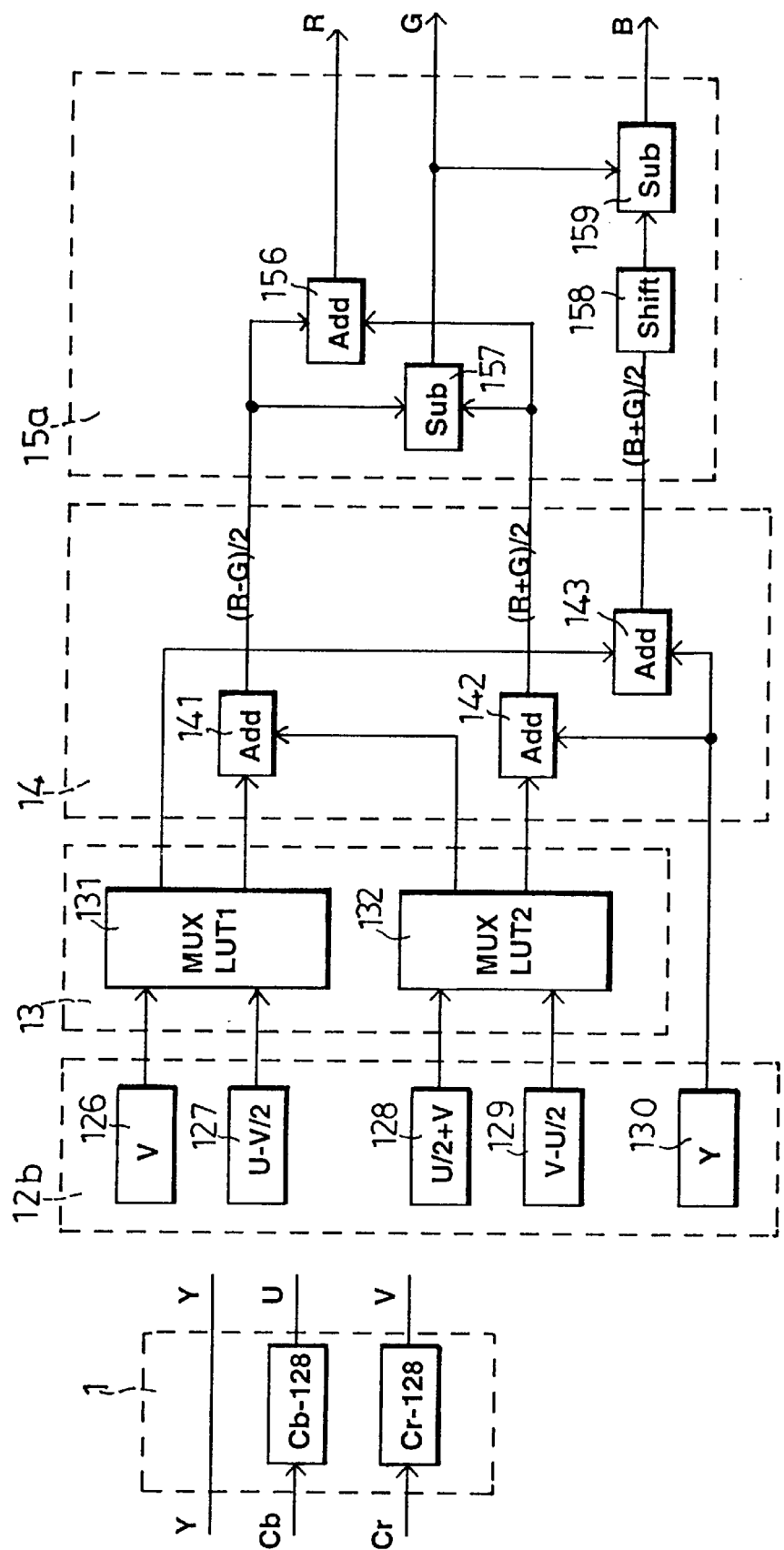
F I G. 8

METHOD FOR PERFORMING PLURAL MATRIX MULTIPLICATION OPERATIONS USING A SHARED LOOK-UP TABLE

CROSS REFERENCE TO RELATED APPLICATION

This application is a continuation of Application No. 08/872,360, filed Jun. 10, 1997, now U.S. Pat. No. 5,963,263, the disclosure of which is incorporated fully herein by reference.

BACKGROUND OF THE INVENTION

1. Field of the Invention

The invention relates to a method and apparatus for performing color space conversion, more particularly to a method and apparatus requiring a fewer number of look-up tables for converting digitized luminance-chrominance color space signals to digitized RGE color space signals.

2. Description of the Related Art

It is desirable to merge a video signal with graphic signals in a multi-media computer system. The video signal may come from a television image processing system having a capture or frame grabbing capability, or from a compressed video playback of a CD-ROM or network transmission. Color space conversion is needed in image processing applications to convert luminance-chrominance color space signals, which offer the advantages of a lower transmission bandwidth and a lower data storage requirement, into RGB color space signals, which are used when displaying an image on a computer monitor.

CCIR 601, which was proposed by the Comite Consultatif International des Radiocommunications (CCIR), establishes the following formulas for converting from the YCbCr luminance-chrominance color space to the RGB color space:

$$R=Y+1.402(Cr-128) \quad (a.1)$$

$$G=Y-0.714(Cr-128)-0.344(Cb-128) \quad (a.2)$$

$$B=Y+1.772(Cb-128) \quad (a.3)$$

If U and V are used to represent the shifted chrominance components (Cb-128) and (Cr-128), respectively, Equations (a.1) to (a.3) can be rewritten as follows:

$$R=Y+1.402V \quad (b.1)$$

$$G=Y-0.714V-0.344U \quad (b.2)$$

$$B=Y+1.772U \quad (b.3)$$

where Y ranges between [0, 2551,] and U and V range between [−128, 127] in an 8-bit representation for each of the Y, Cb and Cr color space components.

Color space conversion is often implemented by employing multipliers or look-up tables to achieve the matrix multiplication operations. Look-up tables are preferred because of their less complicated constructions. It is noted that the matrix multiplication operations dominate the hardware complexity of a color space converting apparatus. As such, the number of look-up tables is critical in determining the cost of implementing the color space converting apparatus. To implement the YCbCr to RGB color space conversion of Equations (a.1) to (a.3), a conventional color space converter usually requires four look-up tables to perform the matrix multiplication of chrominance components. Although the use of four look-up tables is less expensive to implement as compared to another conventional color space converter which uses a 3-by-3 multiplication matrix, a further reduction in the number of look-up tables is desirable.

SUMMARY OF THE INVENTION

Therefore, the object of the present invention is to provide a method and apparatus requiring less than four look-up tables for converting digitized luminance-chrominance color space signals to digitized RGB color space signals.

Accordingly, it is found that Equations (b.1) to (b.3) can be rearranged as follows to result in RGB color combination signals by linearly combining the conversion formulas:

$$R-G=0.714(2V)+0.344(U+2V) \quad (c.1)$$

$$B-G=0.714(2U+V)+0.344(2U) \quad (c.2)$$

$$R+B-G=Y+0.714(2U+2V)+0.344(2U+2V) \quad (c.3)$$

$$B+G=2\,Y+0.714(2U-V) \quad (c.4)$$

$$R+G=2Y+0.344(2V-U) \quad (c.5)$$

Equations (c.1) to (c.5) list a set of possible linear combinations of Equations (b.1) to (b.3). Note that Equations (c.1) to (c.5) use only two coefficients, namely 0.714 and 0.344, for matrix multiplications. Consequently, no more than two look-up tables may be used to convert luminance-chrominance color space signals to RGB color combination signals. Therefore, conversion from the luminance-chrominance color space to the RGB color space can be implemented using fewer than four look-up tables by converting the luminance-chrominance color space signals to the RGB color combination signals expressed as a function of predetermined linear combinations of the chrominance color space signals as defined by the appropriate conversion formulas, and by linearly combining the resulting RGB color combination signals to obtain the RGB color space signals.

According to one aspect of the invention, a method for converting digitized luminance-chrominance color space signals to digitized RGB color space signals comprises the steps of:

generating a plurality of predetermined linear combinations of the chrominance color space signals and at least one predetermined binary combination of the luminance color space signal;

providing a multiplexed multiplication unit which receives the linear combinations of the chrominance color space signals, the multiplexed multiplication unit including no more than two look-up tables which contain digitized transformation values for performing matrix multiplications of the linear combinations of the chrominance color space signals;

linearly combining the digitized transformation values outputted by the multiplexed multiplication unit and the binary combination of the luminance color space signal in a first predetermined manner to generate three RGB color combination signals; and linearly combining the RGB color combination signals in a second predetermined manner to obtain the RGB color space signals.

According to another aspect of the invention, an apparatus for converting digitized luminance-chrominance color space signals to digitized RGB color space signals comprises:

a first combining unit for generating a plurality of predetermined linear combinations of the chrominance color space signals and at least one predetermined binary combination of the luminance color space signal;

a multiplexed multiplication unit connected to the first combining unit to receive the linear combinations of the chrominance color space signals therefrom, the multiplexed multiplication unit including no more than two look-up tables which contain digitized transformation values for performing matrix multiplications of the linear combinations of the chrominance color space signals;

a second combining unit connected to the multiplexed multiplication unit and the first combining unit, the second combining unit linearly combining the digitized transformation values outputted by the multiplexed multiplication unit and the binary combination of the luminance color space signal in a first predetermined manner to generate three RGB color combination signals; and a third combining unit connected to the second combing unit, the third combining unit linearly combining the RGB color combination signals in a second predetermined manner to obtain the RGB color space signals.

In one embodiment, the multiplexed multiplication unit comprises first and second multiplexed look-up tables.

The first multiplexed look-up table includes: a first multiplexer having a plurality of data inputs which receive selected ones of the linear combinations of the chrominance color space signals, and a data output, the first multiplexer selecting each of the data inputs thereof in sequential first timing phases and providing data present at the selected one of the data inputs to the data output thereof; a first one of the look-up tables having an input connected to the data output of the first multiplexer, the first one of the look-up tables outputting the digitized transformation value corresponding to product of the data at the input thereof and a predetermined first coefficient; and a plurality of first data latches, each of which is connected to the first one of the look-up tables so as to latch outputs of the first one of the look-up tables during the sequential first timing phases, respectively.

The second multiplexed look-up table includes: a second multiplexer having a plurality of data inputs which receive selected ones of the linear combinations of the chrominance color space signals, and a data output, the second multiplexer selecting each of the data inputs thereof in sequential second timing phases and providing data present at the selected one of the data inputs to the data output thereof; a second one of the look-up tables having an input connected to the data output of the second multiplexer, the second one of the look-up tables outputting the digitized transformation value corresponding to product of the data at the input thereof and a predetermined second coefficient; and a plurality of second data latches, each of which is connected to the second one of the look-up tables so as to latch outputs of the second one of the look-up tables during the sequential second timing phases, respectively.

In another embodiment, the multiplexed multiplication unit includes no more than one look-up table and comprises a multiplexed look-up table including: a multiplexer having a plurality of data inputs which receive the linear combinations of the chrominance color space signals, and a data output, the multiplexer selecting each of the data inputs thereof in sequential timing phases and providing data present at the selected one of the data inputs to the data output thereof; the look-up table having an input connected to the data output of the multiplexer, the look-up table outputting the digitized transformation value corresponding to product of the data at the input thereof and a predetermined coefficient; and a plurality of data latches, each of which is connected to the look-up table so as to latch outputs of the look-up table during the sequential timing phases, respectively.

Preferably, a compensating unit is connected to the third combining unit and adds error compensating codes to the RGB color space signals.

BRIEF DESCRIPTION OF THE DRAWINGS

Other features and advantages of the present invention will become apparent in the following detailed description of the preferred embodiments with reference to the accompanying drawings, of which:

FIG. 5 is a functional block diagram of the fourth preferred embodiment of a color space converting apparatus according to the present invention;

FIG. 6 is a functional block diagram of the fifth preferred embodiment of a color space converting apparatus according to the present invention;

FIG. 8 is a functional block diagram of the seventh preferred embodiment of a color space converting apparatus according to the present invention;

DETAILED DESCRIPTION OF THE PREFERRED EMBODIMENTS

Figure 1:
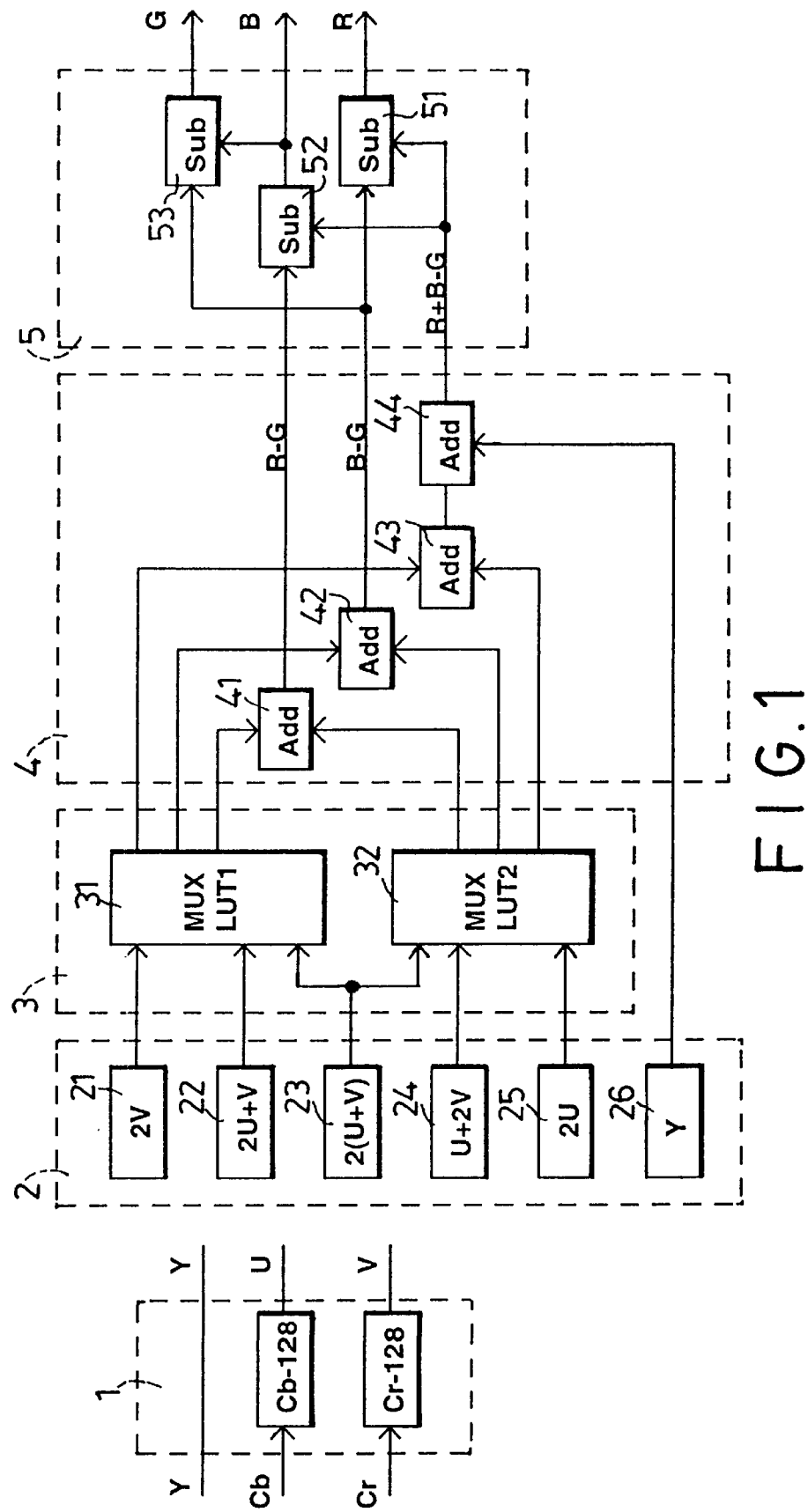
FIG. 1 is a functional block diagram of the first preferred embodiment of a color space converting apparatus according to the present invention.

Before the present invention is described in greater detail, it should be noted that like elements are denoted by the same reference numerals throughout the disclosure.

Referring to FIG. 1, the first preferred embodiment of a color space converting apparatus for converting digitized YCbCr color space signals to digitized RGB color space signals in accordance with this invention is shown to comprise a shifting unit 1, a first combining unit 2, a multiplexed multiplication unit 3, a second combining unit 4, and a third combining unit 5. In this embodiment, color space conversion is performed according to the following equations:

$$R-G=0.714(2V)+0.344(U+2V) \qquad (c.1)$$

$$B-G=0.714(2U+V)+0.344(2U) \qquad (c.2)$$

$$R+B-G=Y+0.714(2U+2V)+0.344(2U+2V) \qquad (c.3)$$

It is noted that Equations (c.1), (c.2) and (c.3) involve three multiplication operations using the coefficient 0.714, and three multiplication operations using the coefficient 0.344.

The shifting unit 1 receives the digitized Cb and Cr chrominance signals and shifts the same by subtracting a constant value of 128 therefrom to obtain the digitized U and V chrominance signals, respectively. The shifting unit 1 is optional if the input chrominance signals are the digitized U and V chrominance signals instead of the digitized Cb and Cr chrominance signals.

The first combining unit 2 receives the digitized U and V chrominance signals and the digitized Y luminance signal from the shifting unit 1. The first combining unit 2 includes chrominance combination blocks 21, 22, 23, 24, 25 for generating the linearly combined chrominance signals 2V, 2U+V, 2(U+V), U+2V and 2U, respectively, and a Y multiple block 26 which outputs the Y luminance signal.

The multiplexed multiplication unit 3 includes two multiplexed look-up tables 31, 32. The first multiplexed look-up table 31 receives the combined chrominance signals from the chrominance combination blocks 21, 22, 23 of the first combining unit 2, and contains digitized transformation values for performing the matrix multiplications which involve the coefficient 0.714. The second multiplexed look-up table 32 receives the combined chrominance signals from the chrominance combination blocks 23, 24, 25 of the first combining unit 2, and contains digitized transformation values for performing the matrix multiplications which involve the coefficient 0.344.

The second combining unit 4 includes four adders 41, 42, 43, 44 which receive partial values outputted by the multiplexed look-up tables 31, 32 and the Y luminance signal from the Y multiple block 26, and which combine the same to generate a set of RGB color combination signals, namely R−G, B−G and R+B−G.

The third combining unit 5 includes three subtracting units 51, 52, 53 which receive the RGB color combination signals from the second combining unit 4 and which combine the same to generate the RGB color space signals, respectively.

Figure 2:
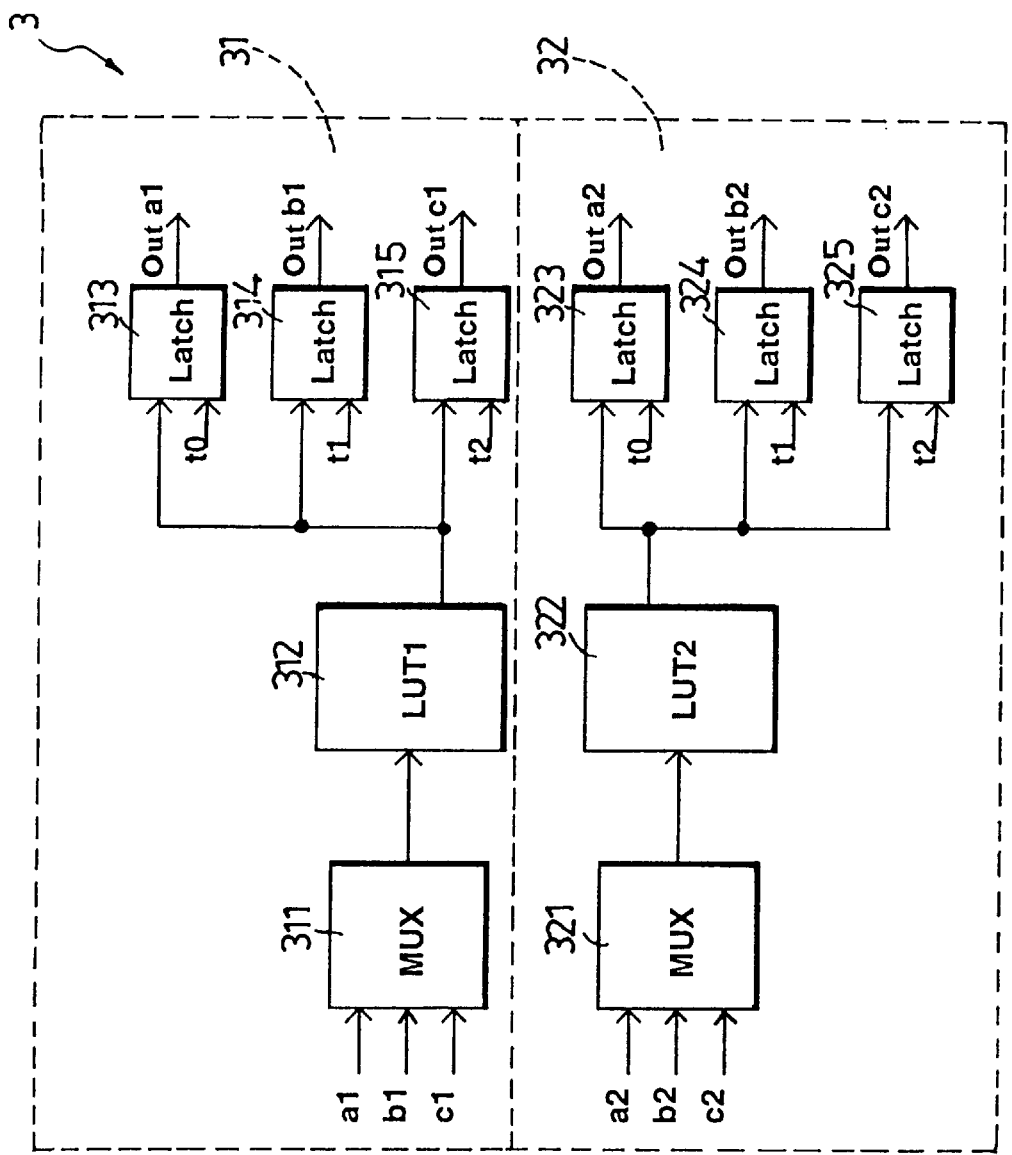
FIG. 2 is a functional block diagram of a multiplexed multiplication unit of the first preferred embodiment.

FIG. 2 illustrates the multiplexed multiplication unit 3 of the first preferred embodiment in greater detail. As shown, the first multiplexed look-up table 31 includes a first multiplexer 311 having three data inputs a1, b1, c1, a first look-up table 312 having an input connected to a data output of the first multiplexer 311, and three data latches 313, 314, 315, each of which is connected to an output of the first look-up table 312. The first multiplexer 311 selects each of the data inputs a1, b1, c1 in three sequential timing phases t0, t1, t2, and provides the selected data at the output thereof. The first look-up table 312 outputs the digitized transformation value corresponding to the product of the data at the input thereof and the coefficient 0.714. The latches 313, 314, 315 latch the outputs of the first look-up table 312 during the sequential timing phases t0, t1, t2, respectively.

The second multiplexed look-up table 32 includes a second multiplexer 321 having three data inputs a2, b2, c2, a second look-up table 322 having an input connected to a data output of the second multiplexer 321, and three data latches 323, 324, 325, each of which is connected to an output of the second look-up table 322. The second multiplexer 321 selects each of the data inputs a2, b2, c2 in three sequential timing phases t0, t1, t2, and provides the selected data at the output thereof. The second look-up table 322 outputs the digitized transformation value corresponding to the product of the data at the input thereof and the coefficient 0.344. The latches 323, 324, 325 latch the outputs of the second look-up table 322 during the sequential timing phases t0, t1, t2, respectively. Preferably, the timing phases t0, t1, t2 for the first and second multiplexed look-up table units 31, 32 occur simultaneously.

Figure 3:
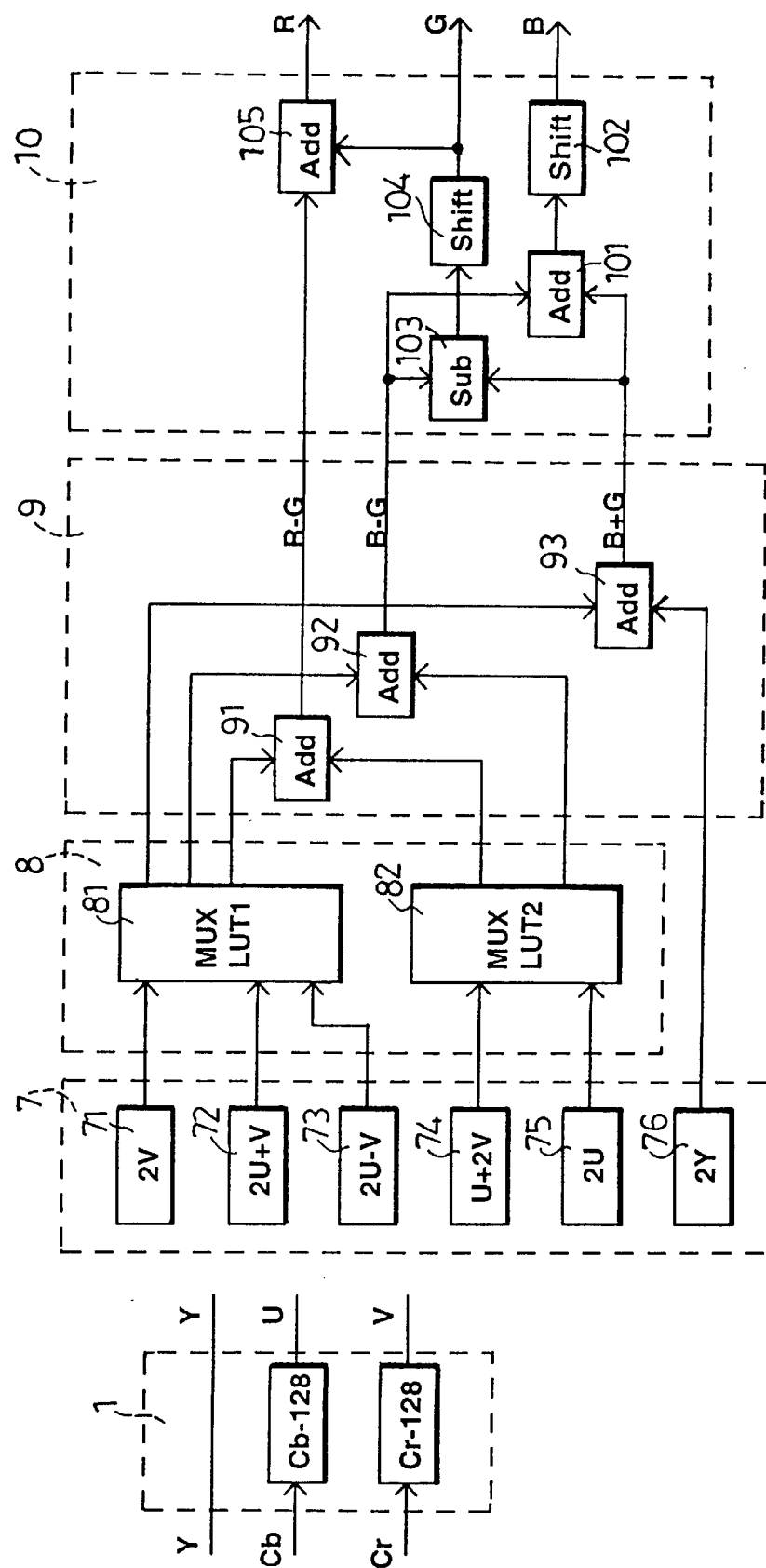
FIG. 3 is a functional block diagram of the second preferred embodiment of a color space converting apparatus according to the present invention.

Referring to FIG. 3, the second preferred embodiment of a color space converting apparatus for converting digitized YCbCr color space signals to digitized RGB color space signals in accordance with this invention is shown to comprise a shifting unit 1, a first combining unit 7, a multiplexed multiplication unit 8, a second combining unit 9, and a third combining unit 10. In this embodiment, color space conversion is performed according to the following equations:

$$R-G=0.714(2V)+0.344(U+2V) \qquad (c.1)$$

$$B-G=0.714(2U+V)+0.344(2U) \qquad (c.2)$$

$$B+G=2Y+0.714(2U-V) \qquad (c.4)$$

It is noted that Equations (c.1), (c.2) and (c.4) involve three multiplication operations using the coefficient 0.714, and two multiplication operations using the coefficient 0.344.

The first combining unit 7 receives the digitized U and V chrominance signals and the digitized Y luminance signal from the shifting unit 1. The first combining unit 7 includes chrominance combination blocks 71, 72, 73, 74, 75 for generating the combined chrominance signals 2V, 2U+V, 2U−V, U+2V and 2U, respectively, and a Y multiple block 76 for generating the 2Y luminance signal.

The multiplexed multiplication unit 8 includes two multiplexed look-up tables 81, 82. The first multiplexed look-up table 81 receives the combined chrominance signals from the chrominance combination blocks 71, 72, 73 of the first combining unit 7, and contains digitized transformation values for performing the matrix multiplications which involve the coefficient 0.714. The second multiplexed look-up table 82 receives the combined chrominance signals from the chrominance combination blocks 74, 75 of the first combining unit 7, and contains digitized transformation values for performing the matrix multiplications which involve the coefficient 0.344.

The second combining unit 9 includes three adders 91, 92, 93 which receive partial values outputted by the multiplexed look-up tables 81, 82 and the 2Y luminance signal from the Y multiple block 76, and which combine the same to generate a set of RGB color combination signals, namely R−G, B−G and B+G.

The third combining unit 10 includes an adder 101 for adding the B−G and B+G color combination signals, a shifter 102 for shifting the output of the adder 101 to obtain the B color space signal, a subtracting unit 103 for generating the difference of the B−G and B+G color combination signals, a shifter 104 for shifting the output of the subtracting unit 103 to obtain the G color space signal, and an adder 105 for adding the R−G color combination signal and the G color space signal to obtain the R color space signal.

The multiplexed multiplication unit 8 is generally similar to that shown in FIG. 2, except that the second multiplexed look-up table 82 includes a second multiplexer (not shown) having two data inputs that are selected in two sequential timing phases, a second look-up table (not shown), and two latches (not shown) which latch the output of the second look-up table during the sequential timing phases, respectively.

Figure 4:
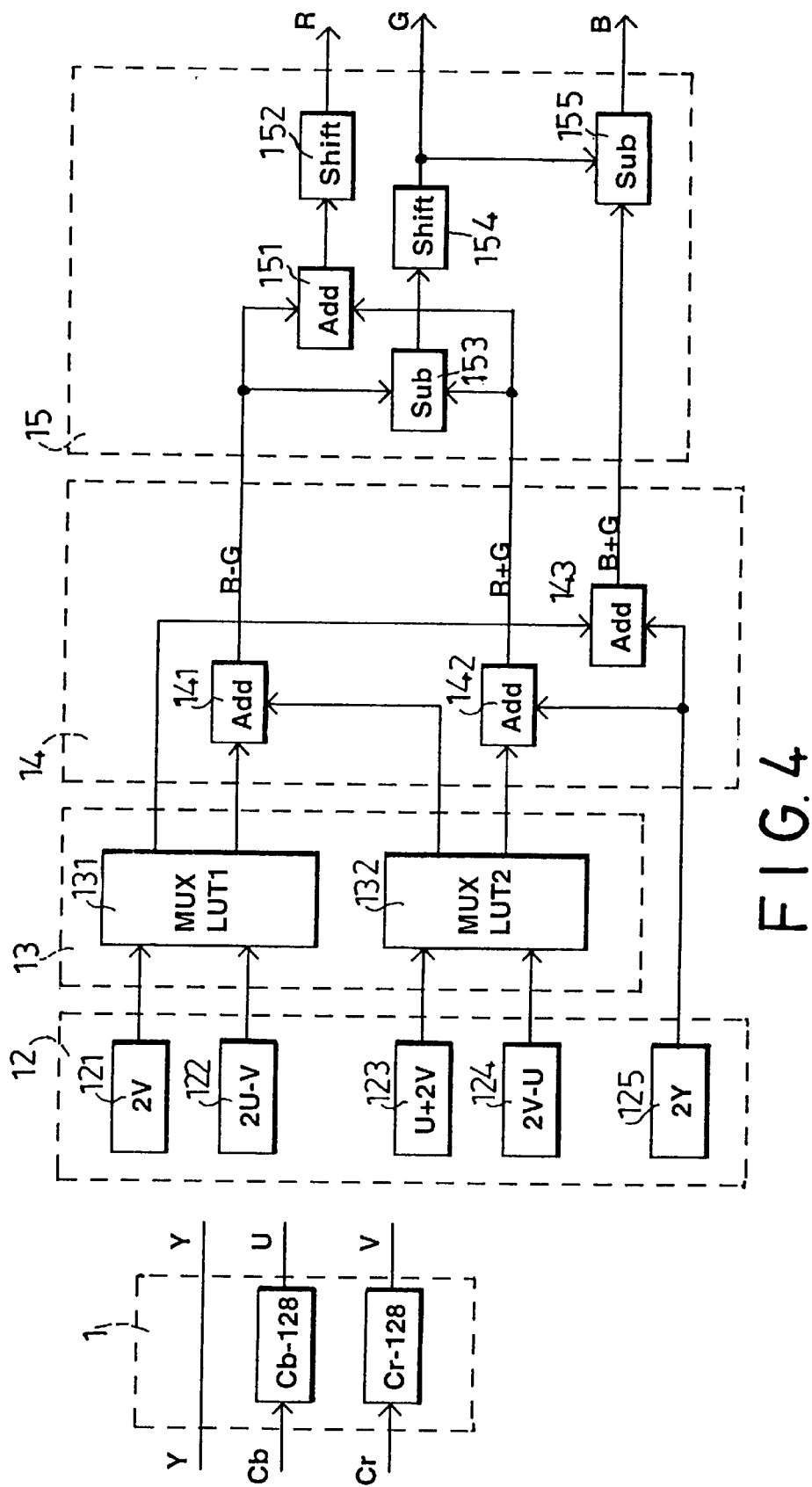
FIG. 4 is a functional block diagram of the third preferred embodiment of a color space converting apparatus according to the present invention.

Referring to FIG. 4, the third preferred embodiment of a color space converting apparatus for converting digitized YCbCr color space signals to digitized RGB color space signals in accordance with this invention is shown to comprise a shifting unit 1, a first combining unit 12, a multiplexed multiplication unit 13, a second combining unit 14, and a third combining unit 15. In this embodiment, color space conversion is performed according to the following equations:

$$R-G = 0.714(2V) + 0.344(U+2V) \quad (c.1)$$

$$B+G = 2Y + 0.714(2U-V) \quad (c.4)$$

$$R+G = 2Y + 0.344(2V-U) \quad (c.5)$$

It is noted that Equations (c.1), (c.4) and (c.5) involve two multiplication operations using the coefficient 0.714, and two multiplication operations using the coefficient 0.344.

The first combining unit 12 receives the digitized U and V chrominance signals and the digitized Y luminance signal from the shifting unit 1. The first combining unit 12 includes chrominance combination blocks 121, 122, 123, 124 for generating the combined chrominance signals 2V, 2U−V, U+2V and 2V−U, respectively, and a Y multiple block 125 for generating the 2Y luminance signal.

The multiplexed multiplication unit 13 includes two multiplexed look-up tables 131, 132. The first multiplexed look-up table 131 receives the combined chrominance signals from the chrominance combination blocks 121, 122 of the first combining unit 12, and contains digitized transformation values for performing the matrix multiplications which involve the coefficient 0.714. The second multiplexed look-up table 132 receives the combined chrominance signals from the chrominance combination blocks 123, 124 of the first combining unit 12, and contains digitized transformation values for performing the matrix multiplications which involve the coefficient 0.344.

The second combining unit 14 includes three adders 141, 142, 143 which receive partial values outputted by the multiplexed look-up tables 131, 132 and the 2Y luminance signal from the Y multiple block 125, and which combine the same to generate a set of RGB color combination signals, namely R−G, R+G and B+G.

The third combining unit 15 includes an adder 151 for adding the R−G and R+G color combination signals, a shifter 152 for shifting the output of the adder 151 to obtain the R color space signal, a subtracting unit 153 for generating the difference of the R−G and R+G color combination signals, a shifter 154 for shifting the output of the subtracting unit 153 to obtain the G color space signal, and a subtracting unit 155 for generating the difference of the B+G color combination signal and the G color space signal to obtain the B color space signal.

The multiplexed multiplication unit 13 is generally similar to that shown in FIG. 2, except that each of the multiplexed look-up tables 131, 132 includes a multiplexer (not shown) having two data inputs that are selected in two sequential timing phases, a look-up table (not shown), and two latches (not shown) which latch the output of the look-up table during the sequential timing phases, respectively.

It is noted that the preceding embodiments can be modified by changing the binary coefficients of the combined chrominance signals and the binary combination of the luminance signal from the first combining unit, and by modifying the subsequent processing units for compensation purposes. In the embodiments of FIGS. 5 to 8, the combined chrominance signals from the chrominance combination blocks 126, 127, 128, 129 of the first combining unit 12a, 12b are half of those from the chrominance combination blocks 121, 122, 123, 124 of the first combining unit 12 of the embodiment of FIG. 4.

Referring to FIG. 5, in order to ensure proper operation of the color space converting apparatus based on the same set of conversion formulas used in the embodiment of FIG. 4, the multiplexed multiplication unit 13a of this embodiment includes two multiplexed look-up tables 133, 134, the values contained therein being twice those found in the multiplexed look-up tables 131, 132 of the multiplexed multiplication unit 13 so as to compensate for differences in the combined chrominance signals from the first combining units 12, 12a without modifying the second and third combining units 14, 15.

Referring to FIG. 6, in order to ensure proper operation of the color space converting apparatus based on the same set of conversion formulas used in the embodiment of FIG. 4 without modifying the multiplexed multiplication unit 13 and the third combining unit 15, the second combining unit 14a of this embodiment further includes four shifters 144, 145, 146, 147 which interconnect the multiplexed multiplication unit 13 and the adders 141, 142, 143. The shifters 144, 145, 146, 147 perform a left shift of the outputs of the multiplexed look-up tables 131, 132 to compensate for the division of the combined chrominance signals from the first combining unit 12a.

Figure 7:
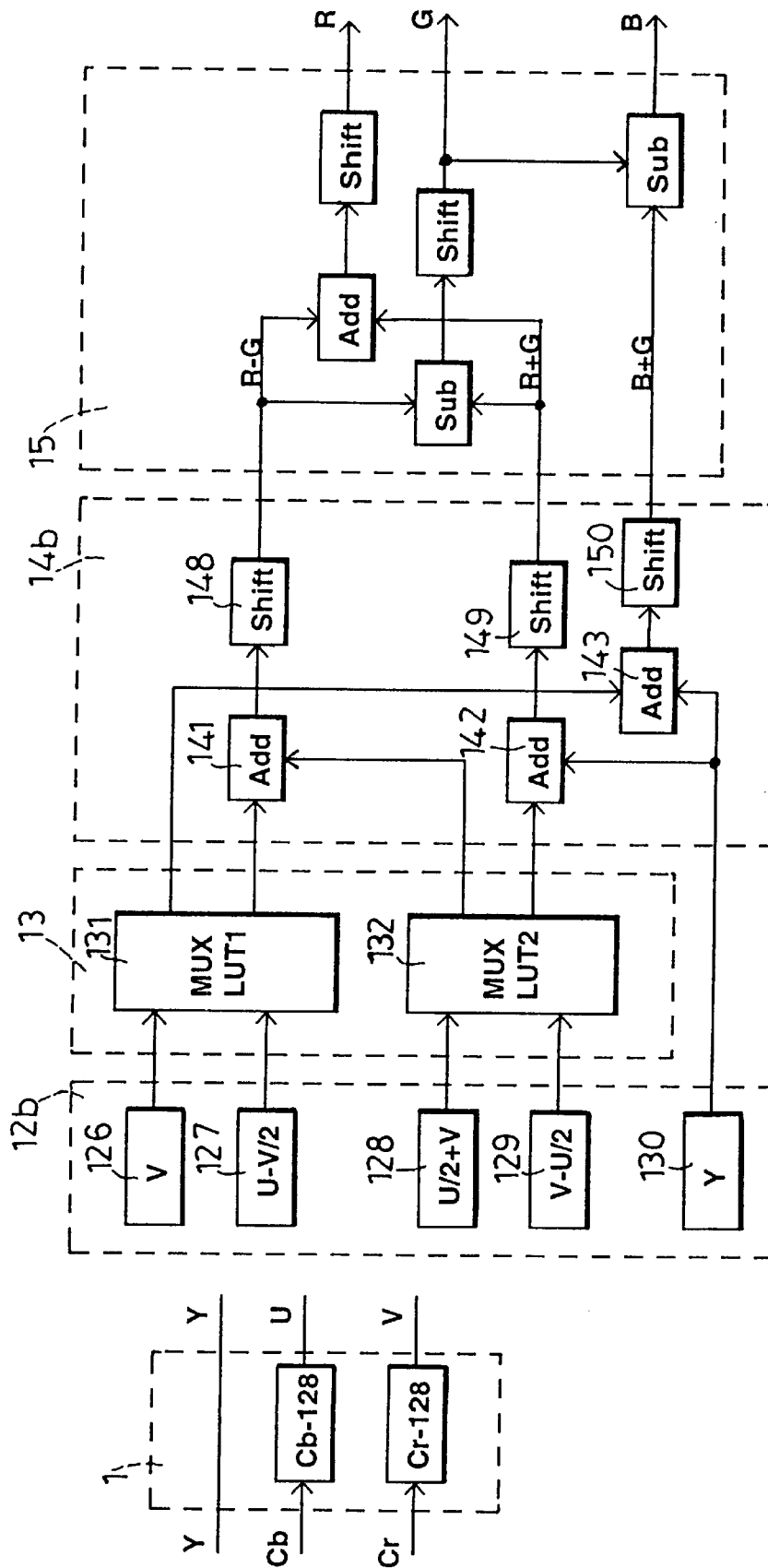
FIG. 7 is a functional block diagram of the sixth preferred embodiment of a color space converting apparatus according to the present invention.

In the embodiment of FIG. 7, the Y multiple block 130 of the first combining unit 12b outputs the Y luminance signal instead of the 2Y luminance signal as generated by the Y multiple block 125 of the first combining unit 12a of the embodiments of FIGS. 5 and 6. In order to ensure proper operation of the color space converting apparatus based on the same set of conversion formulas used in the embodiment of FIG. 4 without modifying the multiplexed multiplication unit 13 and the third combining unit 15, the second combining unit 14b of this embodiment further includes three shifters 148, 149, 150 which interconnect the adders 141, 142, 143 and the third combining unit 15. The shifters 148, 149, 150 perform a left shift of the outputs of the adders 141, 142, 143 to compensate for the division of the combined chrominance signals from the first combining unit 12b.

FIG. 8 illustrates still another embodiment of the present invention. As shown, using the first combining unit 12b of FIG. 7 and the multiplexed multiplication unit 13 and the second combining unit 14 of FIG. 4, the third combining unit 15a is modified in order to ensure proper operation of the color space converting apparatus based on the same set of conversion formulas used in the embodiment of FIG. 4. As shown, the third combining unit 15a includes an adder 156 for adding the (R−G)/2 and (R+G)/2 color combination signals from the adders 141, 142 of the second combining unit 14 to obtain the R color space signal, a subtracting unit 157 for generating the difference of the (R−G)/2 and (R+G)/2 color combination signals to obtain the G color space signal, a shifter 158 for performing a left shift of the (B+G)/2 color combination signal from the adder 143 of the second combining unit 14, and a subtracting unit 159 for generating the difference of the B+G color combination signal from the shifter 158 and the G color space signal from the subtracting unit 157 to obtain the B color space signal.

Note that, aside from the conversion formulas of Equations (c.1) to (c.5), Equations (b.1) to (b.3) can be further rearranged as follows:

$$B-G = 0.714[(3-\delta)U+V] \quad (d.1)$$

$$R+B-G = Y + 0.714[(3-\delta)(U+V)] \quad (d.2)$$

$$B+G=2Y+0.714(2U-V) \quad (d.3)$$

$$R-G=0.344[(6+\epsilon)V+U] \quad (d.4)$$

$$R+B-G=Y+0.344[(6+\epsilon)(V+U)] \quad (d.5)$$

$$R+G=2Y+0.344(2V-U) \quad (d.6)$$

where $\delta=0.036$, $\epsilon=0.151$.

Equations (d.1) to (d.6) mean that, by tolerating an error term, the use of only one look-up table is permitted in the conversion of digitized luminance-chrominance color space signals to digitized RGB color space signals.

Figure 9:
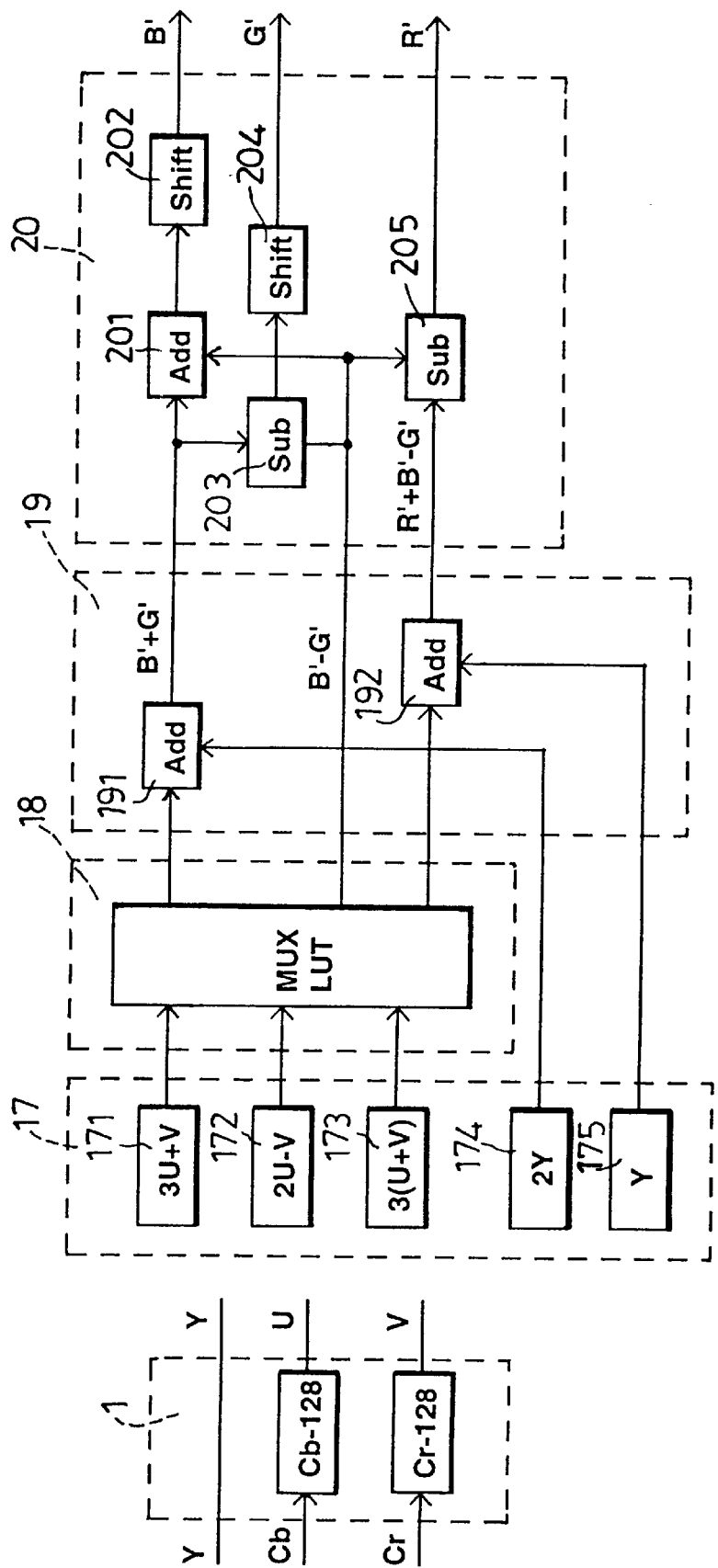
FIG. 9 is a functional block diagram of the eighth preferred embodiment of a color space converting apparatus according to the present invention.

Referring to FIG. 9, the eighth preferred embodiment of a color space converting apparatus for converting digitized YCbCr color space signals to digitized RGB color space signals in accordance with this invention is shown to comprise a shifting unit 1, a first combining unit 17, a multiplexed multiplication unit 18, a second combining unit 19, and a third combining unit 20. In this embodiment, color space conversion is performed according to the following equations:

$$B-G=0.714[(3-\delta)U+V] \quad (d.1)$$

$$R+B-G=Y+0.714[(3-\delta)(U+V)] \quad (d.2)$$

$$B+G=2Y+0.714(2U-V) \quad (d.3)$$

It is noted that Equations (d.1), (d.2) and (d.3) only involve three multiplication operations using the coefficient 0.714 if the error term $\delta$ is to be ignored.

The first combining unit 17 receives the digitized U and V chrominance signals and the digitized Y luminance signal from the shifting unit 1. The first combining unit 17 includes chrominance combination blocks 171, 172, 173 for generating the combined chrominance signals 3U+V, 2U−V and 3(U+V), respectively, and two Y multiple blocks 174, 175 for outputting the 2 Y and Y luminance signals, respectively.

The multiplexed multiplication unit 18 includes a multiplexer (not shown) having three data inputs that receive the combined chrominance signals from the chrominance combination blocks 171, 172, 173 of the first combining unit 17 and that are selected in three sequential timing phases, a look-up table (not shown) containing digitized transformation values for performing the matrix multiplications which involve the coefficient 0.714, and three latches (not shown) which latch the output of the look-up table during the sequential timing phases, respectively.

The second combining unit 19 includes two adders 191, 192 which receive partial values outputted by the multiplexed multiplication unit 18 and the combined luminance signals from the Y multiple blocks 174, 175 and which combine the same to generate a set of R'G'B'color combination signals, namely B'+G', B'−G' and R'+B'−G'.

The third combining unit 20 includes a subtracting unit 205 for generating the difference of the R'+B'−G'and B'−G' color combination signals to obtain the R'color signal, a subtracting unit 203 for generating the difference of the B'+G' and B'−G' color combination signals, a shifter 204 for shifting the output of the subtracting unit 203 to obtain the G' color signal, an adder 201 for adding the B'+G' and B'−G' color combination signals, and a shifter 202 for shifting the output of the adder 201 to obtain the B' color signal.

The R', G' and B' color signals approximate the R, G and B color space signals respectively by a corresponding small error code eR, eG, eB because the error term $\delta$ in Equations (d.1) to (d.3) was ignored. The error codes eR, eG, eB can be calculated as follows:

$eB=\frac{1}{2}(-0.714*\delta*U)$; eB ranges between $[-1.65, 1.66]$ $eG=\frac{1}{2}(0.714*\delta*U)$; eG ranges between $[-1.66, 1.65]$ $eR=-0.714*\delta*V$; eR ranges between $[-3.30, 3.33]$ The calculated errors are insignificant in terms of color because their levels are relatively small, especially for applications that do not require further conversion of the resultant RGB color space signals.

Similarly, only one coefficient 0.344 is needed if color space conversion is performed according to the Equations (d.4), (d.5) and (d.6) mentioned beforehand.

The error codes eB, eG, eR range respectively between [−3.32, 3.30 ], [−3.30, 3.32 ] and [−6.65, 6.60 ] if the error term $\epsilon$ was ignored.

Figure 10:
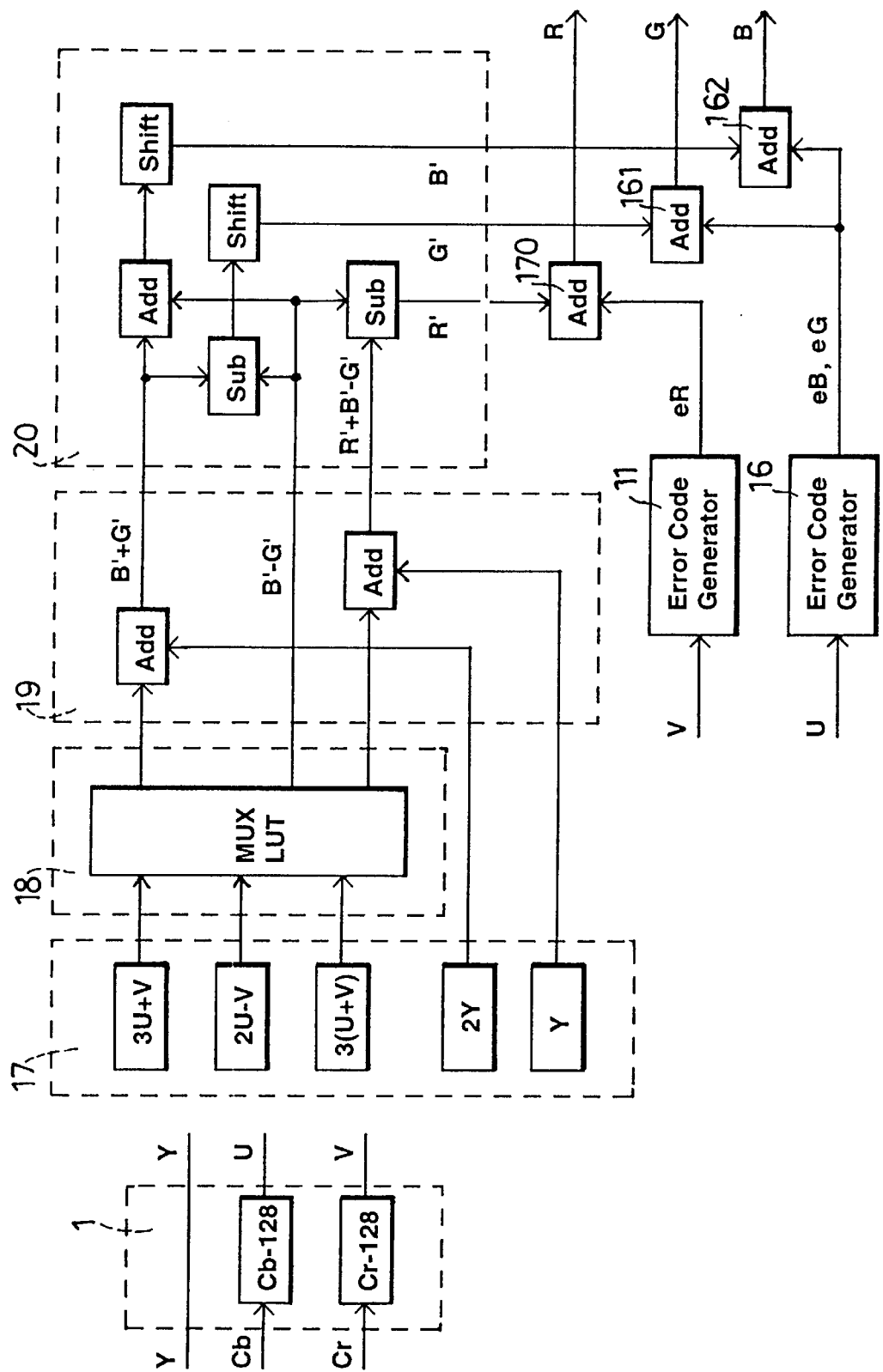
FIG. 10 is a functional block diagram of the ninth preferred embodiment of a color space converting apparatus according to the present invention.

Referring to FIG. 10, the embodiment of FIG. 9 can be modified so as to compensate the R'G'B' color signals to obtain the precise RGB color space signals.

As shown, a first error code generator 11 receives the digitized v chrominance signal and generates the error compensating code eR for the R color space signal in accordance with Table I.

TABLE I

| V | eR |
|---|---|
| {97, 98, ... 127} | 3 |
| {58, 59, ... 96} | 2 |
| {20, 21, ... 57} | 1 |
| {−19, −18, ... 19} | 0 |
| {−57, −56, ... −20} | −1 |
| {−96, −95, ... −58} | −2 |
| {−128, −127, ... −97} | −3 |

A second error code generator 16 receives the digitized U chrominance signal and generates the error compensating codes eG, eB for the G and B color space signals in accordance with Table II.

TABLE II

| U | eG, eB |
|---|---|
| {116, 117, ... 127} | 2 |
| {39, 40, ... 115} | 1 |
| {−38, −37, ... 38} | 0 |
| {−115, −114, ... −39} | −1 |
| {−128, −127, ... −116} | −2 |

An adder 110 adds the error compensating code eR to the R' color signal to obtain the R color space signal. An adder 161 adds the error compensating code eG to the G' color signal to obtain the G color space signal. An adder 162 adds the error compensating code eB to the B'color signal to obtain the B color space signal. Note that the error compensating codes eB and eG are identical. In addition, all error compensating codes eR, eG, eB are rounded to the nearest integer.

Although the preferred embodiments are shown as hardwired blocks in a dedicated hardware circuitry, the present invention may be easily and efficiently implemented using a microprocessor and the associated system memory to implement the calculation of the conversion.

It has thus been shown that, in the present invention, luminance-chrominance to RGB color space conversion can be implemented using no more than two look-up tables. Thus, a relatively inexpensive and highly efficient color space converting method and apparatus has been realized. The object of the present invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for performing plural matrix multiplication operations, a first one of the matrix multiplication operations being performed to obtain a product of a predetermined coefficient and a first variable, a second one of the matrix multiplication operations being performed to obtain a product of the predetermined coefficient and a second variable, the method comprising:

constructing a look-up table having a plurality of entries, each of the entries corresponding to one of a plurality of values of the first and second variables and stored in each of the entries is a product of a corresponding value of the first and second variables multiplied by the predetermined coefficient; and determining one of the plurality of values of the first and second variables to select a corresponding one of the entries in the look-up table, such that the product stored in the corresponding one of the entries is generated at an output of the look-up table, thereby obtaining a result of a selected one of the first and second multiplication operations.

2. The method of claim 1 further comprising the step of latching the product generated at the output of the look-up table when the selected one of the first and second variables addresses the look-up table.

3. The method of claim 1 wherein the first and second variables are digitized luminance-chrominance color space signals, and the predetermined coefficient is one associated with the digitized luminance-chrominance color space signals in a set of color space conversion formulas for converting the digitized luminance-chrominance color space signal to digitized RGB color space signals.

* * * * *

UNITED STATES PATENT AND TRADEMARK OFFICE
CERTIFICATE OF CORRECTION

PATENT NO.   : 6,211,917 B1
DATED        : April 3, 2001
INVENTOR(S)  : Rong-Fuh Shyu It is certified that error appears in the above-identified patent and that said Letters Patent is hereby corrected as shown below:

<u>Column 12,</u>
Line 19, replace "signal to" with -- signals to --

Signed and Sealed this

Second Day of July, 2002

Attest:

JAMES E. ROGAN
Attesting Officer            Director of the United States Patent and Trademark Office